United States Patent
Sun et al.

[15] 3,678,339
[45] July 18, 1972

[54] SIGNAL TRANSMITTING SYSTEM FOR EXTRA HIGH VOLTAGE TRANSMISSION LINE

[72] Inventors: Shan C. Sun, Penn Hills; Paul O. Raygor, Irwin, both of Pa.;

[73] Assignee: Westinghouse Electric Corporation, Pittsburgh, Pa.

[22] Filed: March 25, 1971

[21] Appl. No.: 127,874

[52] U.S. Cl. .................................... 317/58, 322/3, 333/72
[51] Int. Cl. ......................................................... H02h 1/00
[58] Field of Search ........................... 317/58; 322/3; 333/72

[56] References Cited

UNITED STATES PATENTS

| | | | |
|---|---|---|---|
| 3,260,969 | 7/1966 | Jacobsen | 333/72 X |
| 3,295,064 | 12/1966 | White | 333/72 X |
| 3,227,925 | 1/1966 | Cook | 317/58 |
| 3,315,147 | 4/1967 | Cook et al. | 317/58 X |

*Primary Examiner*—James D. Trammell
*Attorney*—A. T. Stratton, C. L. Freedman and John L. Stoughton

[57] ABSTRACT

An apparatus for providing power for transmitting relaying signals from an extra high voltage transmission line to ground potential which avoids the use of a high cost current transformer and which is immediately effective to provide such signals when the transmission line is initially energized to protect such line if it is energized when a fault is present. The apparatus supplies the power from ground potential to line potential by means of sonic quantity transmitted from a first transducer to a second transducer through an elongated rod-like insulating member which preferably is caused to vibrate at its resonant frequency.

11 Claims, 4 Drawing Figures

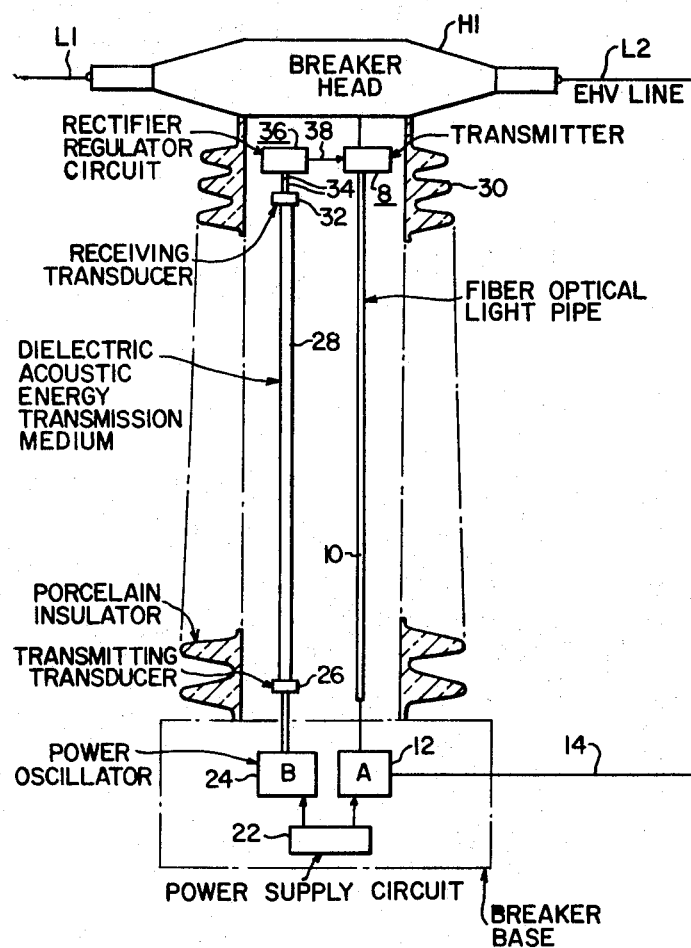
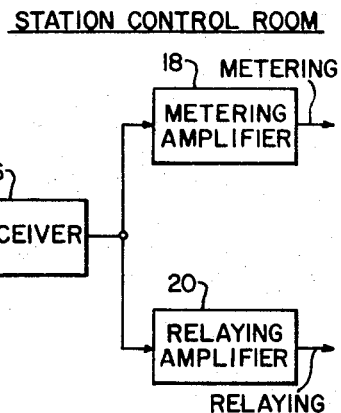
FIG. 2.
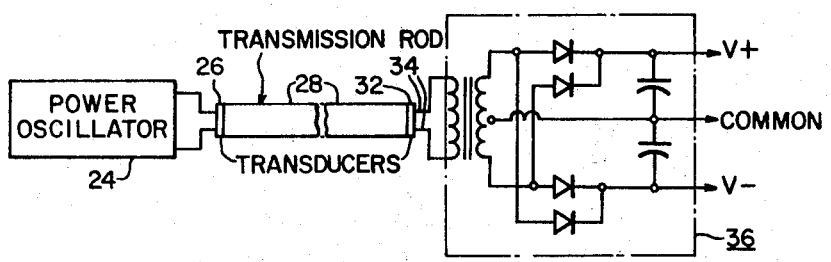
FIG. 4.

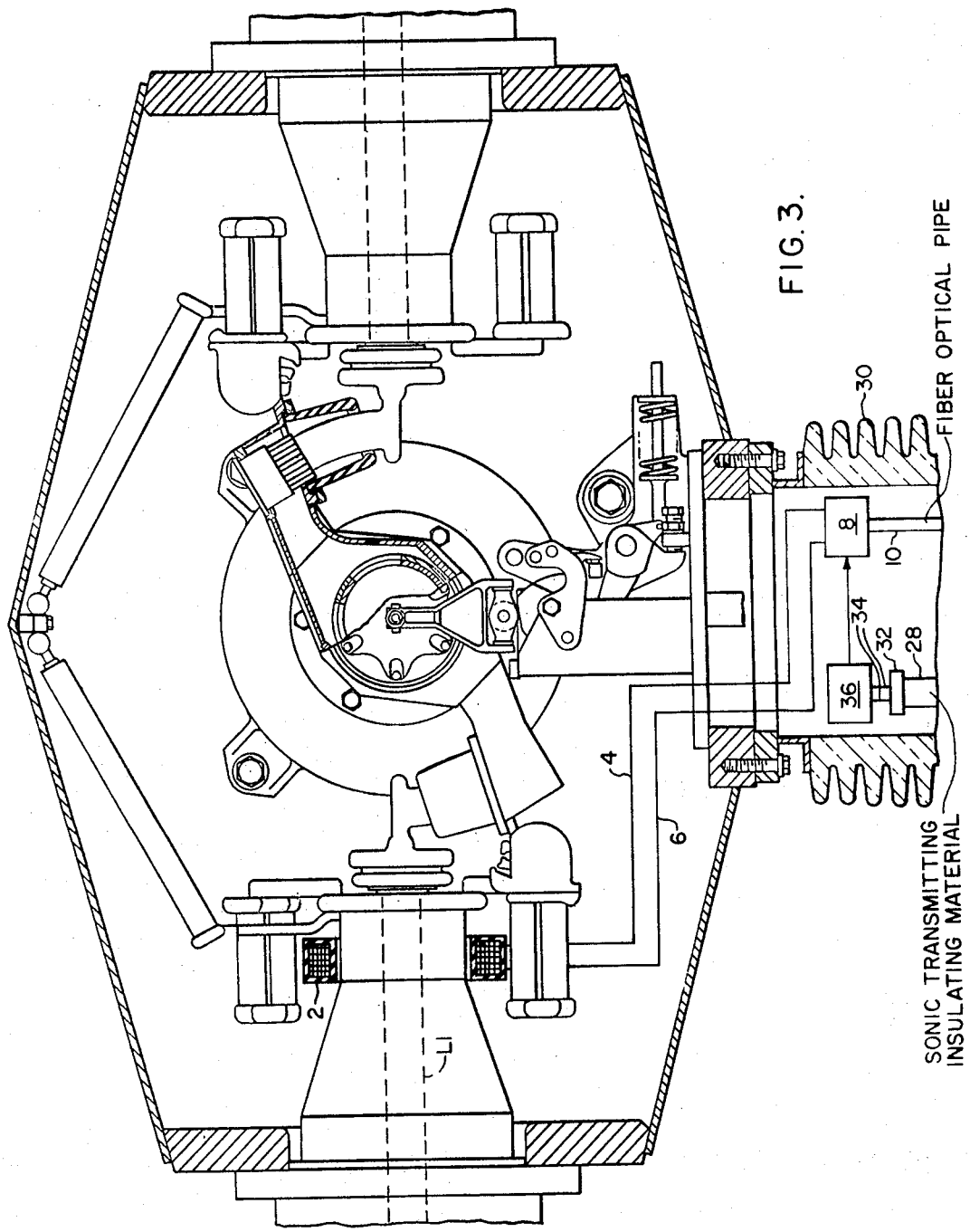

SIGNAL TRANSMITTING SYSTEM FOR EXTRA HIGH TRANSMISSION LINE

BRIEF SUMMARY OF THE INVENTION

The invention contemplates an electric powered protective relaying system in which a power source is utilized to energize a vibration producing transducer maintained at a potential not greatly different from ground potential for transmitting the produced vibrations to a second transducer over an elongated rod-like member of insulating material; the second transducer being located adjacent an element subject to energization at high voltage and effective to generate electric power from the energy transmitted thereto in the form of vibrations and to energize a transmitter also located adjacent to the element subject to such high voltage whereby the transmitter is powered to transmit its signal from an energy supply not substantially higher than ground potential and independent of the energized condition of such energized element.

For a better understanding of the invention, reference may be had to the preferred embodiment, exemplary of the invention, shown in the accompanying drawings, in which:

FIG. 2 is a schematic illustration of apparatus for obtaining current signals from the extra high voltage line to ground potential and embodying the invention;

FIG. 3 is a partial view in section showing in greater detail the portion of the apparatus shown in FIG. 2; and, FIG. 4 is a schematic showing of the power supply system.

DETAILED DESCRIPTION OF THE INVENTION

Figure 1:
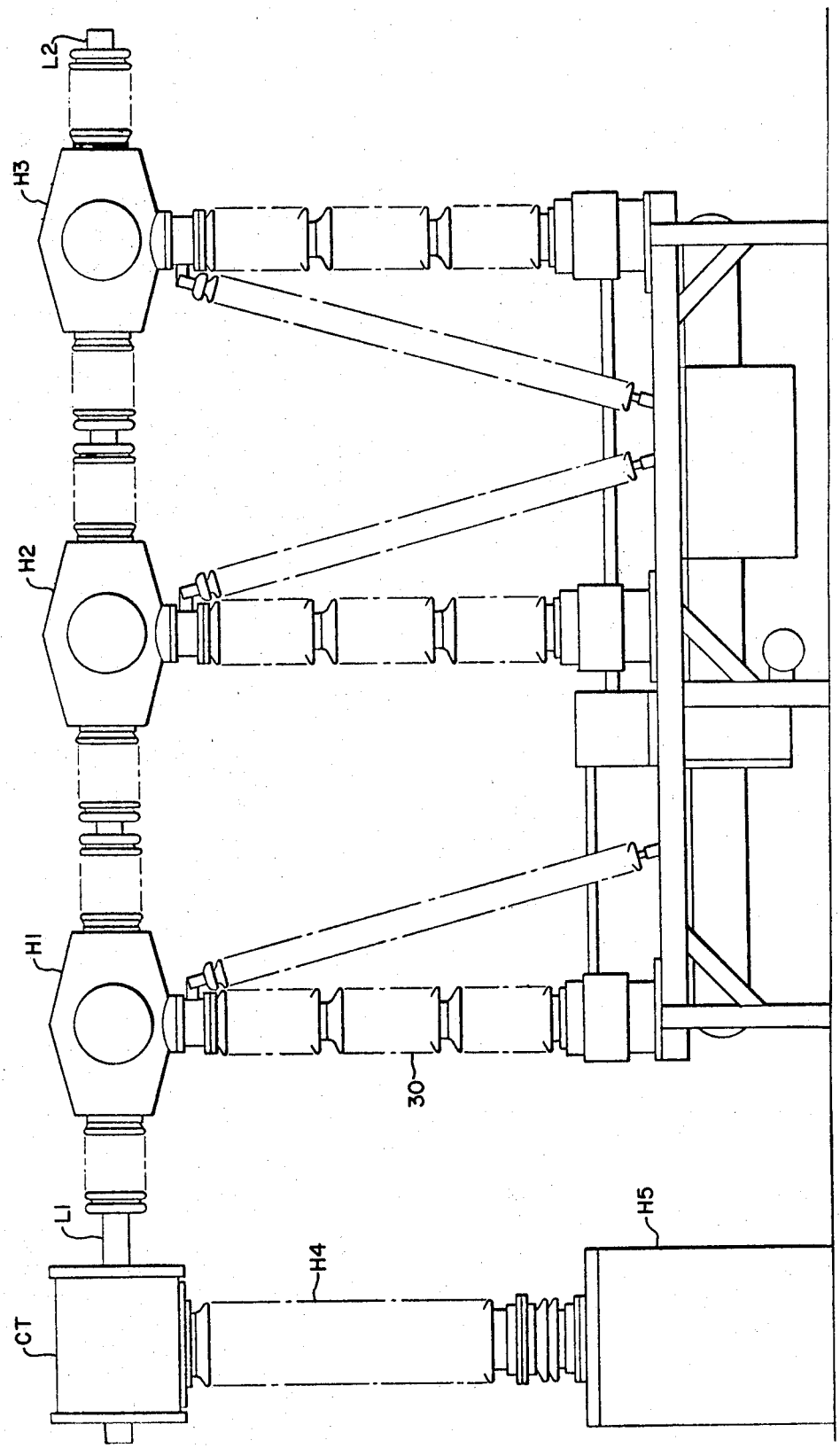
FIG. 1 is a view illustrating the prior art apparatus for deriving a current signal from the high voltage line conductor and transmitting it to ground potential for relaying purposes.

Referring to the drawings by characters of reference and more particularly FIG. 1 the reference character L1 indicates one conductor of a transmission line which is connectable to a second transmission line L2 through a plurality of interrupting head units H1, H2 and H3 and which includes a current transformer CT for transmitting current signals from the line L1 through a housing H4 to the relaying apparatus located in the housing H5. The prior art structure of FIG. 1 is more fully described and illustrated in U.S. Pat. No. 3,291,947 dated Dec. 13, 1966 and issued in the name of R. C. Van Sickle.

The current transformer CT of the FIG. 1 apparatus must be very thoroughly insulated from the line conductor L1 so that operating personnel will not be injured. In the so-called EHV transmission lines in which the voltage of the conductor is of 500,000 and upward approaching, in modern design, a million volts above ground, the cost of a current transformer is economically unjustified. In accordance with this invention as illustrated in FIGS. 2 and 3 a lightly insulated current transformer 2 (FIG. 3) surrounds the conductor L1 and its secondary winding leads 4 and 6 are connected to energize a suitable transmitter 8 which transmits its output signal to ground potential through a fiber optical pipe 10 to a receiver 12 which supplies the current signal through a suitable cable 14 to the receiver 16 which energizes the metering amplifier 18 and the relaying amplifier 20, for metering and relaying purposes. The details of the metering and relaying networks are not illustrated and form no part of this invention.

The details of the transmitter 8 the fiber optical pipe 10 and receiver 12 may vary widely and may take any well known forms in which the transmitter 8 provides a modulated light for transmission through the light pipe 10 and which modulated light is demodulated by the receiver 12 to provide an output signal to the cable 14 which is indicative of the input signals supplied to the transmitter 8. In the present instance, the input signal as illustrated in FIG. 3 is proportional to the current flowing in line L1.

Power for the transmitter 8 (FIG. 2) is supplied from the normal station battery or any other suitable source 22 to a power oscillator 24 having an output power of upwards of 100 watts to provide an oscillatory electrical signal to a transmitting transducer 26 which provides a vibratory output signal to a dielectric energy vibration transmitting elongated member 28 which may be pyrex glass and which extends from a location in the proximity of ground potential upwardly through the interior of one of the insulating column struts 30 to a receiving transducer 32 having an output circuit 34 which energizes a rectifier regulating circuit 36 to supply power to the transmitter 8 by means of the diagrammatically shown connection 38.

The transmitting transducer 26 and receiving transducer 32 may take any desired form and it is sufficient to say that the transmitting transducer 26 should be effective to provide vibrations to the rod-like member 28 in response to the electrical input signals thereto from the power oscillator. Similarly, the receiving transducer 32 need be effective only to receive the vibrations from the rod 28 and transmit them into electrical energy for transmission through the connection 34 to the rectifier and regulating circuit 36 and thence through the connection 38 to energize the transmitter 8.

By the utilization of the power supplied at ground potential through an inexpensive rod-like transmission medium such as a fiber glass reenforced resin rod through a distance which may vary widely depending upon the potential of the extra high voltage line L1 and which distance may well be upward of 25 feet in the case of the potential of an EHV line at a million volts above ground a dependable trouble-free and source of energy is provided which is relatively inexpensive and which is easily serviced without danger to operating personnel.

It is desirable to energize the transmitter 8 independently of transmission line so that if the breaker heads H1–H3 are closed when the line is faulted, the transmitter 8 will immediately transmit the fault signal to the relaying amplifier 20 for relaying purposes whereby the line may be immediately deenergized prior to the occurrence of a high degree of damage. If the transmitter 8 were not previously energized, time would be required to derive energy from the fault current in the line L1 before the transmitter 8 could transmit its signal and more severe damage would occur.

The frequency of the power oscillator is preferably tuned to coincide with the mechanical resonant frequency of the transducer and transmission medium assembly. It has been found that apparatus according to this invention operates with high reliability; there being no moving or lifetime limited parts in the device and provides a relatively high power transmission efficiency. The fiber reenforced resin rods are very rugged and can stand the stresses involved in installation, shipping and the rough usage found at the switching station. Furthermore sufficient power, upwards of 10 watts, can easily be delivered for the energization of the transmitter 8.

It will, therefore, be apparent that there has been disclosed a relaying apparatus which is particularly desirable for use in protecting transmission lines of the higher voltages but which is also useful in protecting lines of lower voltages with respect to ground.

What is claimed and is desired to be secured by United States Letters Patent is as follows:

1. An apparatus for transmitting power from a ground voltage proximity to a high voltage proximity, said apparatus comprising a first portion located in ground voltage proximity and a second portion located in high voltage proximity, said first portion including an oscillator energized from a source of energy and having electric power supplying output terminals and a first power transmitting transducer having input terminals connected to said oscillator output terminals and having a vibrating power supplying output, said second portion including a second power transmitting transducer having a vibration energized input and having electric power supplying output terminals and an electrical energy power consuming load connected to said power output terminals of said second transducer, and an elongated rod-like member extending between said voltage proximities and operatively connecting said output of said first transducer to said input of said second transducer and operative to transmit power therebetween in the form of vibrations, said rod-like member being composed substantially solely of electrical non-conducting material.

2. The combination of claim 1 in which said rod-like member is fabricated of fiber glass reinforced resin and said oscillator is electrically energized.

3. The combination of claim 1 in which said rod-like member is fabricated of pyrex glass.

4. The combination of claim 1 in which the power output of said oscillator is upwards of 100 watts and the power output of said second transducer is upwards of 10 watts.

5. The combination of claim 1 in which said oscillator is tuned to energize said first transducer at the resonant frequency of the combination of said transducers and said rod-like member.

6. Apparatus for transferring signals from a first location which is in proximity to a member subject to energization at a high potential with respect to earth to a second location which is in proximity to ground potential comprising, an intelligence transmitting device located at said first location and having an intelligence input and a power input and an intelligence output, an intelligence receiving device located at said second location and having an intelligence output, said receiving device having an intelligence input operable to receive intelligence transmitted by said intelligence output of said transmitter and to supply said received intelligence to said output of said receiving device, an oscillator located in proximity to ground potential and having power output terminals, a vibration producing transducer having input terminals connected to said power output terminals of said oscillator for energization by said oscillator, a vibration receiving transducer having power supplying output terminals connected to said power input of said transmitting device for energization thereof with power from said receiving transducer, an elongated insulating material vibration transmitting member connected between said transducers and operable to conduct the vibration produced by said producing transducer to said receiving transducer whereby power for said transmitting device is supplied thereto from said oscillator.

7. The combination of claim 6 in which said intelligence is transmitted in the form of light and in which said light is transmitted to said receiving device through an elongated light transmitting rod-like member of insulating material.

8. The combination of claim 7 in which said vibration transmitting member is fabricated of a fiber glass reinforced resin and its length is upwards of 25 feet and the magnitude of the potential difference between said locations is upwards of 500,000 volts.

9. In protective relaying system for a high voltage power conductor, a sensing device in voltage proximity with said conductor and having an output signal which is representative of an operating characteristic of said conductor, an intelligence transmitting device actuated by said output signal and located in voltage proximity with said conductor, an intelligence receiving device actuated by said transmitting device and located in voltage proximity to earth, a first vibratory transducer having an energizable input connection and an output connection operable to provide a vibrating signal in response to the energization of said input connection and located in voltage proximity with earth, a second vibratory transducer located in voltage proximity to said conductor said second transducer having an energizable input connection and an output connection operable to provide output energy in response to the vibratory energization of its said input connection by said vibrating signal and located in voltage proximity with said conductor, means conducting said output energy to said transmitting device to supply the energy thereto for the transmission of intelligence to said intelligence receiving device, and an elongated vibration transmitting member interconnecting said output connection of said first transducer to said input connection of said second transducer for supplying said vibratory signal is transmitted to said second transducer whereby said second transducer is operable to supply said output energy to said intelligence transmitting device.

10. The combination of claim 9 in which said first transducer energizes said elongated transmitting member at an integer multiple of its resonant frequency.

11. The combination of claim 10 in which said even multiple of said resonant frequency is in the ultrasonic range.

* * * * *